United States Patent
Jenski, Jr.

[11] Patent Number: 5,893,391
[45] Date of Patent: Apr. 13, 1999

[54] COUPLING LATCH

[75] Inventor: Gary M. Jenski, Jr., Jackson, Mich.

[73] Assignee: Aeroquip Corporation, Maumee, Ohio

[21] Appl. No.: 08/966,765

[22] Filed: Nov. 10, 1997

Related U.S. Application Data

[60] Provisional application No. 60/052,331, Jul. 11, 1997.
[51] Int. Cl.⁶ ........................................................ F16L 37/28
[52] U.S. Cl. ........................ 137/614.04; 137/614; 285/316
[58] Field of Search ............................ 137/614.04, 614; 285/316, 317

[56] References Cited

U.S. PATENT DOCUMENTS

| | | |
|---|---|---|
| Re. 34,781 | 11/1994 | Spalink et al. . |
| 4,181,150 | 1/1980 | Maldavs . |
| 4,222,411 | 9/1980 | Herzan et al. . |
| 4,805,417 | 2/1989 | Weaver et al. . |
| 4,892,117 | 1/1990 | Spalink et al. . |
| 5,076,324 | 12/1991 | Herman et al. . |
| 5,139,049 | 8/1992 | Jensen et al. . |
| 5,179,976 | 1/1993 | Boland et al. . |
| 5,226,682 | 7/1993 | Marrison et al. . |
| 5,244,010 | 9/1993 | Barjasteh et al. . |
| 5,339,862 | 8/1994 | Haunhorst . |
| 5,343,892 | 9/1994 | Saito ........................ 137/614.04 |
| 5,415,200 | 5/1995 | Haunhorst et al. . |
| 5,450,875 | 9/1995 | Chichester et al. . |
| 5,482,083 | 1/1996 | Jenski . |
| 5,544,858 | 8/1996 | Rogers et al. . |
| 5,553,895 | 9/1996 | Karl et al. . |
| 5,570,910 | 11/1996 | Highlen . |
| 5,586,748 | 12/1996 | Kish ........................ 137/614.04 X |

OTHER PUBLICATIONS

Aeroquip Corporation Brochure of its bulletin No. 2292 showing its FD49 Coupling, published 1990.
Aeroquip Corporation Brochure of its FD49 Coupling with Twin Guard® Sealing System, published 1993.

*Primary Examiner*—Kevin Lee
*Attorney, Agent, or Firm*—Emch, Schaffer, Schaub & Porcello, Co., L.P.A.

[57] ABSTRACT

A coupling utilizes a male member having an internal poppet valve yieldingly urged to a closed position and an external ball retention sleeve yieldingly urged toward its connector end engageable with a female member. The female member has an internal poppet valve yieldingly urged to a closed position and a forward connector end wall section having a plurality of apertures in which are positioned balls for engaging an annular groove of the male member. The female member includes a retainer for preventing the balls from falling outwardly from the apertures.

26 Claims, 4 Drawing Sheets

5,893,391

COUPLING LATCH

This application claims benefit of provisional application 60/052,331 filed Jul. 11, 1997.

BACKGROUND OF THE INVENTION

The present invention is directed to a coupling having a male adapter part and a female adapter part which may be joined together by a simple axial movement toward one another. The coupling utilizes, on the female one of the mating adapter parts, a series of circumferentially positioned balls located in apertures of a wall of such part. The male adapter part is provided with a sleeve which, when the parts are disconnected, is yieldingly urged to a forward position. The sleeve encircles the body of the male adapter part. When engaged, the sleeve retains the balls of the female adapter part in an annular groove of the male adapter part to thereby effect the connection.

A number of prior art patents utilize various configurations of balls and sleeves for effecting the joining of a male coupling member to a female coupling member. See for example the following U.S. Pat. Nos. RE 34,781, 4,222,411, 4,892,117, 5,076,324, 5,139,049, 5,179,976, 5,244,010 and 5,339,862. It should be noted that, in all of such prior art patents, the balls and the sleeve are part of the same coupling member, namely, the female member. Under the present invention, the balls are located on the female coupling member while the release sleeve is located on the male coupling member. This feature is a significant factor in providing a reliable coupling in which the parts may be easily connected by a simple axial movement toward one another and which will be effective under extreme conditions of cold temperature.

The coupling of the present invention is useful in a wide variety of fluid flow systems; however, it is particularly well adapted for use in a fluid flow system for cryogenics such as liquid nitrogen in which the liquid flowing through the system and the coupling may have temperatures on the order of -320° F. The design of the coupling of the present invention permits the parts to be readily connected and disconnected while opening and closing the respective poppet valves without the parts becoming frozen and rendered inoperable as a result of the flow of liquid at such low temperatures.

SUMMARY OF THE INVENTION

The coupling of the present invention utilizes a male member having an internal poppet valve yieldingly urged to a closed position and an external ball retention sleeve yieldingly urged toward a forward position toward the connector end of such male member. The female member has an internal poppet valve yieldingly urged to a closed position and a forward connector end wall section having a plurality of apertures in which are positioned retention balls for engaging an annular groove of the male member. As the male member is inserted into the female member, the leading connector end of the male member becomes sealingly engaged with an annular seal in the female member and shortly thereafter the forward ends of the respective poppet valves contact one another such that continued movement of the male member into the female member causes such poppet valves to be urged against their respective compression spring to an open position. A portion of the male member forces the balls outwardly to permit complete insertion of the male member to a position where the balls are axially aligned with an annular groove of the male member, at which position the sleeve causes the balls to be forced radially inwardly into the annular groove. When so positioned, the wall of the sleeve retains the balls in the annular groove thereby retaining the male member attached to the female member. In order to release the male member from the female member, the sleeve is retracted thereby permitting the balls to move radially outwardly thus releasing the male member from the female member. The female member has a cammed surface at least partially aligned with the apertures which limits the radial outward movement of the balls and prevents the balls from falling outwardly of the apertures. The apertures have a smaller size at the interior surface of the wall than the size of the balls thereby preventing the balls from fall inwardly through the wall.

IN THE DRAWINGS

DETAILED DESCRIPTION OF THE INVENTION

Figure 1:
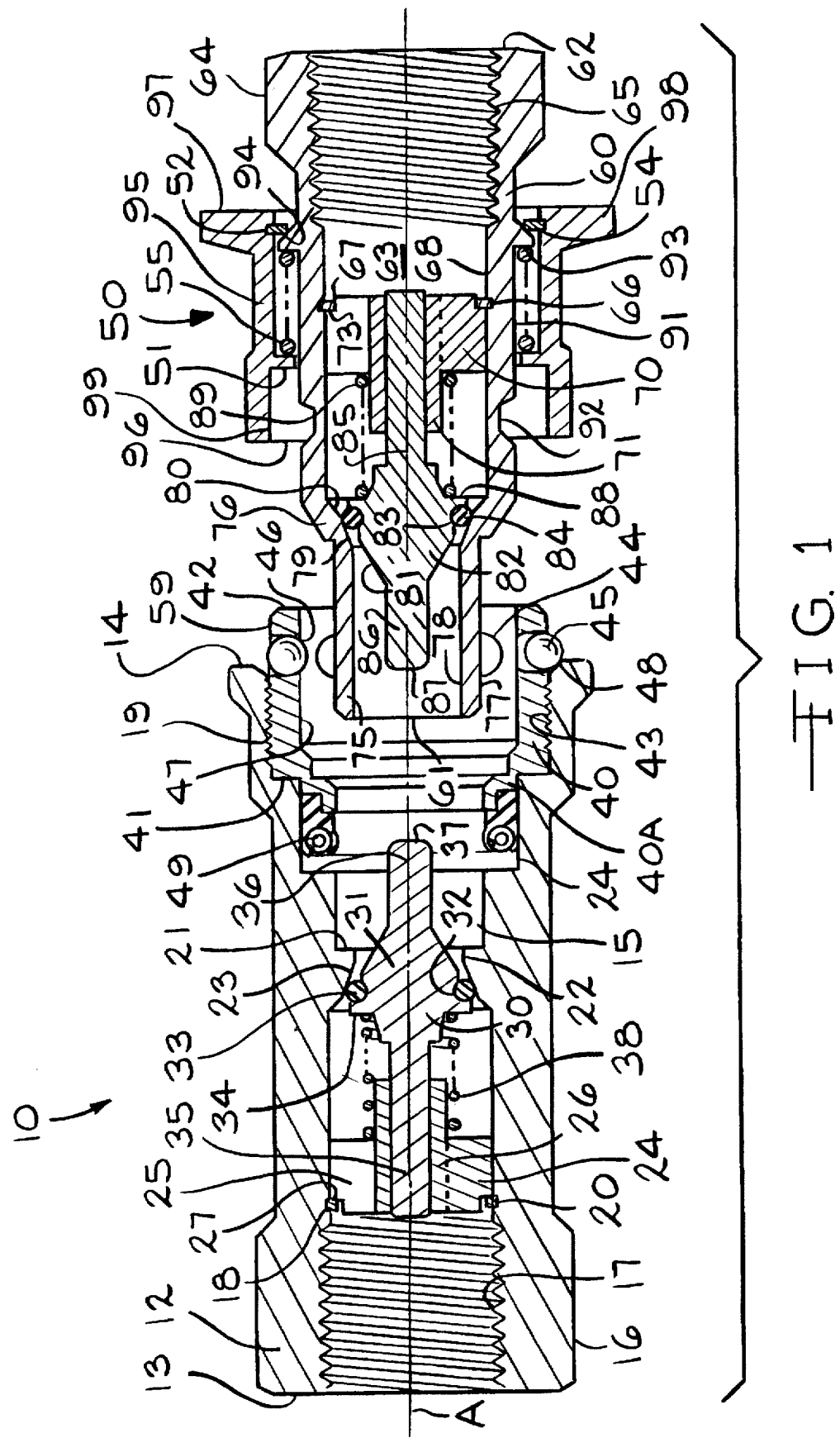
FIG. 1 is a sectional view showing the male adapter part about to be joined to the female adapter part.

Referring to the drawings, there is shown a coupling comprising a female adapter part 10 and a male adapter part 50. The female adapter part 10 includes a body 12 extending from a first end 13 to a second end 14. The body includes a longitudinal passageway 15 extending along an axis A. Adjacent the first end 13, the body is provided exteriorly with a series of flats 16 defining a hexagon and interiorly with threads 17 for engagement with a fluid flow line (not shown).

On the opposite side of the threads from the first end 13 is an inwardly facing annular groove 18 in which is positioned a metal snap ring 20. The body 12 is provided with a unitary constrictor defined by a radially inwardly extending ledge 21, a short wall segment 22 extending axially therefrom and a sealing surface 23 which tapers outwardly from wall segment 22 toward the first end 13.

A guide 25 having an integral, unitary guide tube 26 is rigidly positioned in the passageway 15. The guide 25 has three wings 24 each having a recess defining a shoulder 27 at the end adjacent the threads. The shoulder 27 is in abutting relationship with the snap ring 18.

Slidably positioned in the guide tube 26 is a poppet 30. The poppet 30 has an enlarged head 31 with a outwardly facing groove 32 in which is position an O-ring 33, for example one formed of Teflon®. The head 31, groove 32 and O-ring 33 are sized such that when the poppet 30 is in the positioned shown in FIG. 1 (the forward position), the O-ring 33 will be sealingly engaged to the tapered sealing surface 23. Spaced rearwardly from the groove 32 is a radial shoulder 34. Extending rearwardly from the head is a cylindrical post 35 which extends through the guide tube 26 and is slidably engaged therewith. Extending forwardly from the head 31 is a probe 36 terminating at an engagement end 37. The body 12 also has inwardly facing threads 19 adjacent the second end 14.

A compression spring 38 is positioned with one end resting against the wings 24 and the opposing end resting against the shoulder 34 of the poppet 30. The spring functions to yieldingly urge the poppet 30 and its O-ring 33 into sealing engagement with the tapered sealing surface 23.

A short tubular segment 40 is threadedly engaged to the threads 19 by outwardly facing threads 43. The tubular segment 40 has a first end 41, the outer portion of which is engaged to a shoulder of the body 12 and a second end 42 which extends axially outwardly beyond the end 14 of the body.

Adjacent the threads 43 and spaced from the second end 42, the tubular segment 40 is provided with a series of eight holes 44 in substantially equal spaced apart relationship circumferentially around the tubular segment 40. Positioned in each of the holes 44 is a spherical metal ball 45. The balls 45 have a diameter larger than the wall thickness of the tubular segment 40 in the area of the holes 44. Additionally, the holes 44 at the outer surface of the wall and throughout a major portion of the thickness of such wall is slightly larger in size than the balls 45 so that the balls may freely move inwardly and outwardly in the holes 44. However, the holes 44 have a reduced size constricted area 46 at the interior surface 47. Therefore the balls 45, although being sized such that they can extend slightly inwardly from the interior surface 47, cannot move completely through the constricted area 46. Thus, the diameter of the opening at the constricted area 46 adjacent the interior surface 47 is slightly smaller than the diameter of the balls 45.

The second end 14 of the body has a tapered surface 48 extending to the inwardly facing threads 19. The surface 48 tapers inwardly in an axial direction toward the first end 13. As a result, when the tubular segment 40 is screwed completely into the threads 19 of the body 12 at a time when the balls 45 are positioned in the holes 44 (i.e., to the position shown in FIG. 1), the tapered surface 48 will prevent the balls 45 from falling out of the holes 44 on the exterior side of the tubular segment. As a result, the balls 45, although free to float radially inwardly and outwardly, are retained in the holes 44. As will be appreciated, the position of the tapered surface 48 when the tubular segment 40 is threaded completely such that the first end 41 bottoms on the radial shoulder of the body 12 is such as to permit the balls 45 to extend outwardly a sufficient distance that no part of the balls is forced to extend inwardly beyond the interior surface 47. However, as previously noted, the balls 45 can freely float inwardly from the interior surface 47.

A spring loaded Teflon® seal 49 is held in position between an L-shaped extension 40A of tubular segment 40 and the adjacent wall surface 24 of the body.

The male adapter part 50 has a body 60 which extends from a first end 61 to a second end 62 and has a passageway 63 extending along the axis A from the first end 61 to the second end 62. Adjacent the second end 62, the male body 60 is provided exteriorly with a series of flats 64 defining a hexagon and internally with threads 65. Spaced a short distance from the threads 65 is an inwardly facing annular groove 66 in which is positioned a retaining snap ring 67. The groove 66 is formed in a portion of the passageway 63 defined by an inwardly facing cylindrical wall surface 68.

A guide 70 having an integral unitary guide tube 71 is positioned in the passageway. The guide 70 has three wings each having a recess defining a shoulder 73 at the end adjacent the threads. The shoulder is in abutting relationship with the snap ring 67.

The body 60 has a cylindrical nose 75 extending from the first end 61 toward the second end. An outwardly tapering wall portion 76 connects the nose 75 to that portion of the body 60 beginning in the area of the inwardly facing cylindrical wall surface 68 and extending to the second end 62. The cylindrical nose 75 has an exterior cylindrical wall surface 77 slightly larger in diameter than the interior of the spring loaded Teflon® seal 49 so that upon insertion of the cylindrical nose 75 through the Teflon® seal 49, a sealing engagement will be effected between such members. The cylindrical nose 75 also has a cylindrical interior surface 78. The interior cylindrical surface 78 of the nose 75 is joined to the interior cylindrical wall surface 68 by a first tapered surface 79 and a second tapered surface 80.

Figure 4:
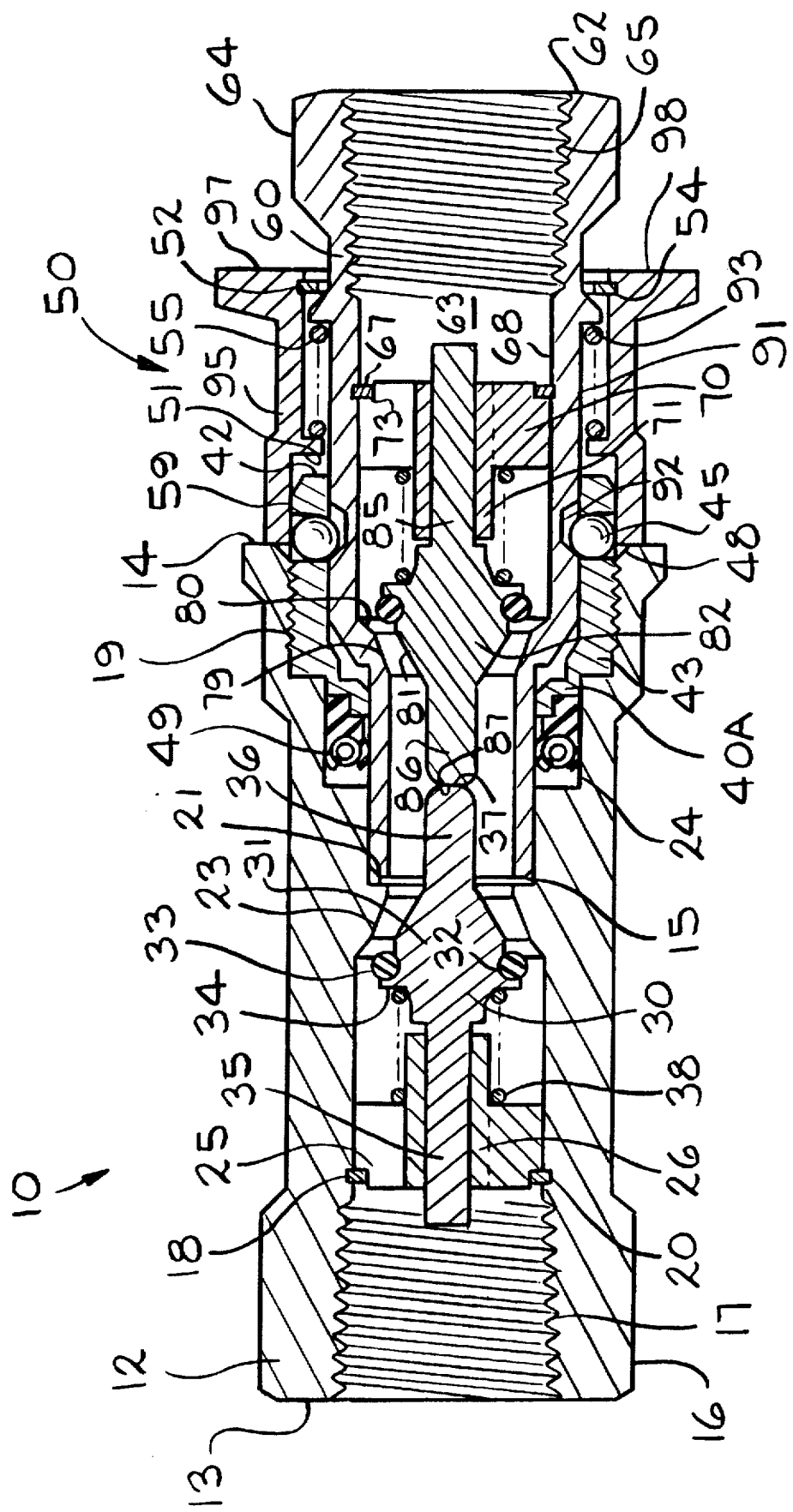
FIG. 4 is a view similar to FIGS. 1 and 2 showing the male adapter part fully engaged to the female adapter part.

A poppet 81 having an enlarged head 82 with an annular groove 83 and an O-ring 84 positioned in such groove is positioned in the passageway 63 for movement from a closed position at which the O-ring 84 is engaged to the first tapered surface 79 as shown in FIG. 1 to an open, fully retracted position shown in FIG. 4.

Extending axially from the head 82 toward the second end 62 is a post 85 which is supported for slidable movement in the guide tube 71. Extending in the other direction from the head 82 is a probe 86 terminating at an engagement end 87. The head 82 is provided with a radially outwardly extending shoulder 88 facing the second end 62 and is yieldingly urged to the position shown in FIG. 1, at which the O-ring 84 is sealingly engaged to the first tapered surface 79, by a compression spring 89 extending between the shoulder 88 and the guide 70.

In the area of the body 60 between the tapered section 76 and the enlarged portion defining the hexagon shaped flats 64, the body is provided with an outwardly facing cylindrical wall surface 91 having an annular groove 92 positioned axially and sized to receive the inner portion of each of the balls 45 when the male member 50 is fully engaged to the female member 10 (see FIG. 4). The diameter of the outwardly facing cylindrical wall surface 91 is such as to permit it to be easily received in the internal surface area 47 of the female body 12 but is larger than the diameter of a circle defined by the innermost portion of the balls 45 when the balls 45 are positioned in their innermost radial position as shown in FIG. 4.

Spaced rearwardly from the annular groove 92 toward to second end 62 is an outwardly extending annular flange having a radial shoulder 93 facing the annular groove 92 and a tapered surface 94 facing the second end 62.

Figure 2:
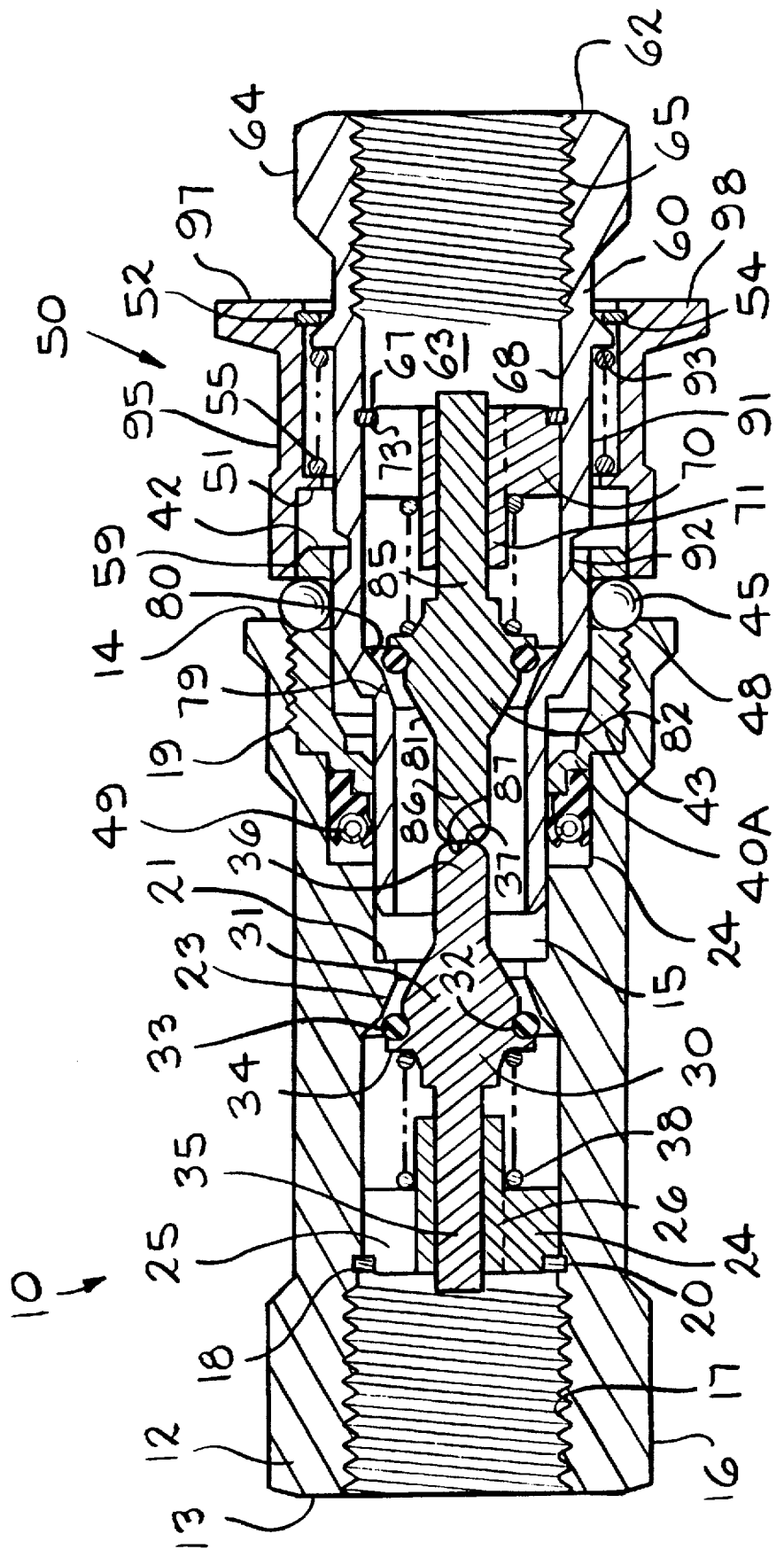
FIG. 2 is a view similar to FIG. 1 showing the partial but not complete connection of the male and female parts.
Figure 3:
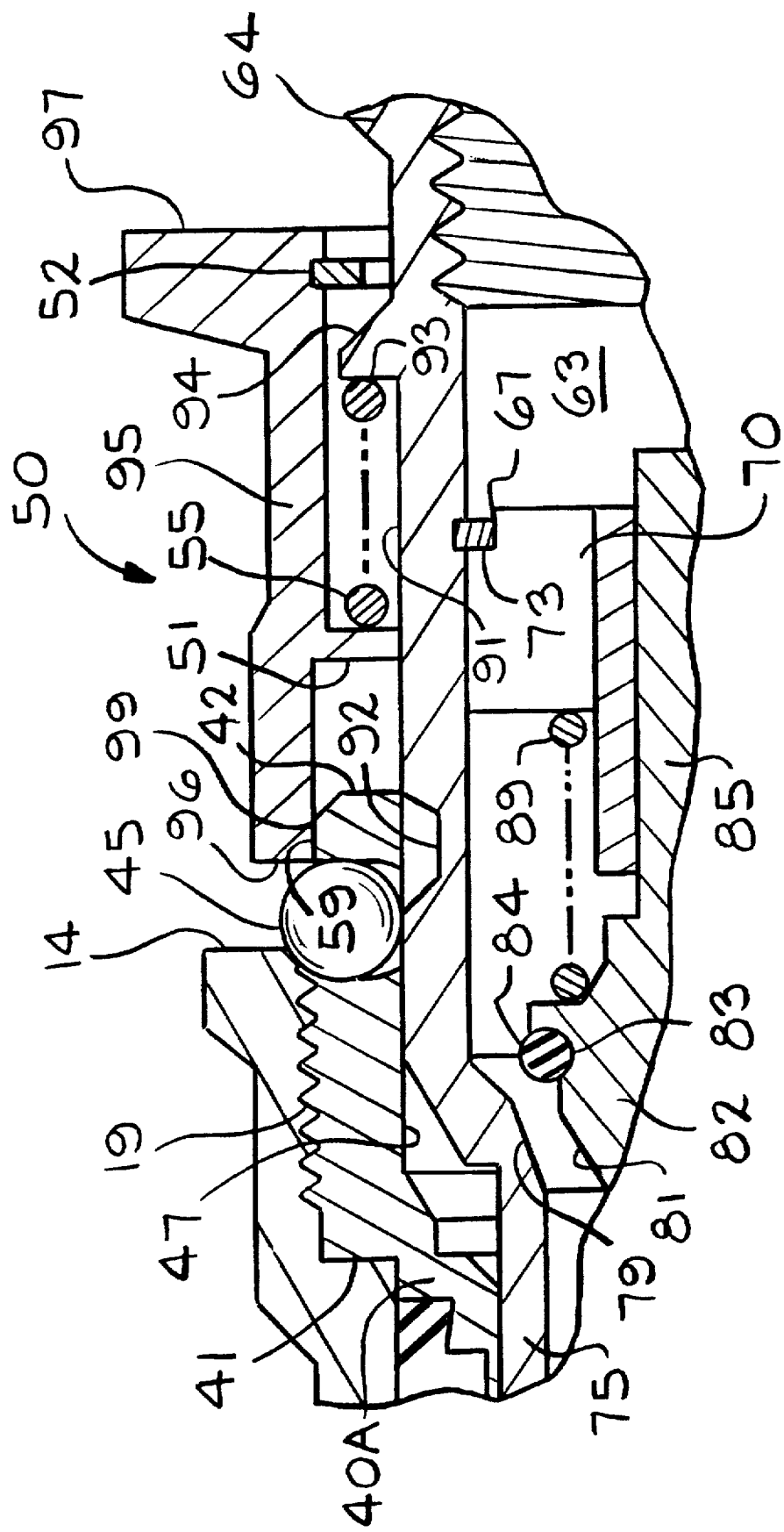
FIG. 3 is a fragmentary view showing retraction of the sleeve caused by continued movement of the parts toward one another following engagement of the end of the sleeve with the balls.

Encircling the body 60 is a ball release sleeve 95 extending from a first end 96 facing toward the first end 61 of the body 60 and a second end 97 facing toward the second end 62 of the body 60. Extending radially outwardly at the second end 97 is a finger grip flange 98. The portion of the release sleeve 95 adjacent the first end 96 has an internal surface 99 slightly larger than the external surface 59 of the tubular segment 40 but smaller than the diameter of a circle defined by the outermost portion of the balls 45 when the balls are at their outermost position permitted by the tapered surface 48 as shown in FIG. 1. Thus, the second end 42 of the tubular segment 40 can be readily inserted into the first end 96 of the release sleeve 95 when the male adapter part is inserted in the female adapter part; however, as shown in FIG. 2, upon such insertion, the first end 96 will contact the outer portions of the balls 45.

The release sleeve 95 is provided with an radially inwardly extending flange 51 in an area spaced from the first end 96 and an inwardly facing annular groove 52 in an area spaced a short distance from the second end 97. A snap ring 54 is positioned in the annular groove 52. The snap ring 54 has an internal diameter smaller than the outer diameter of the flange defined by the radial shoulder 93 and tapered surface 94 and is positioned to engage the tapered surface 94. A compression spring 55 is positioned in the space between the body 60 and the release sleeve 95 and has one end engaged to the inwardly extending flange 51 of the ball release sleeve 95 and the other end engaged to the radial shoulder 93 of the body 60. Accordingly, the spring 55 yieldingly urges the release sleeve toward the first end 61 of the body 60.

As can be readily seen by comparing FIGS. 1 through 4, the coupling of the present invention may have the female adapter part 10 and the male adapter part 50 easily connected together by a simple push-to-connect movement in which the male part 50 is moved directly into the female part 10 without the necessity of the person effecting such engagement manipulating any of the individual parts of either the female part 10 or the male part 50. Thus, as may be seen in FIG. 2, upon insertion, the end 87 of the poppet probe 86 will engage the end 37 of the female poppet probe 36 and further continued axial movement of the male part 50 into the female part 10 will cause the poppet 30 to be retracted against the yielding action of the compression spring 38 and will cause the poppet 81 to be retracted against the yielding action of spring 89 thereby displacing the O-ring 33 from the sealing surface 23 and the O-ring 84 from the first tapered surface 79 thus effectively opening the coupling to the flow of fluid therethrough. In this position, the outer surface 77 of the cylindrical nose 75 has sealingly engaged the spring loaded Teflon® seal 49 to effect a seal; however, the male part 50 is not yet connected to the female part 10.

Further axial movement of the male part 50 into the female part 10 causes the balls, which have been urged outwardly by their engagement by the outer surface of the tapered section 76, to engage the first end 96 of the ball release sleeve 95. As can be seen in FIG. 2, the balls 45, at this point in the operation, are prevented from moving radially inwardly as a result of their engagement with the outwardly facing cylindrical wall surface 91. Accordingly, such continued movement of the male part 50 into the female part 10 will cause the balls 45 to urge the ball release sleeve 95 toward the second end 62 of the male body 60 until the balls reach the position of axial alignment with the annular groove 92, which axial alignment will permit the balls to move radially inwardly to be positioned in such annular groove 92. The balls 45 are urged inwardly as a result of the spring 55 urging the ball release sleeve 95 forwardly to cause the first end 96 of the ball release sleeve to urge against the outer portions of the balls 45.

In order to separate the male adapter part 50 from the female adapter part 10 it is necessary simply for the operator to grasp the outwardly extending finger grip flange 98 of the release sleeve 95 and pull it toward the second end 62 against the urging action of spring 55. When the first end 96 of the release sleeve has been retracted axially beyond the annular groove 92, the balls 45 are free to move radially outwardly and will be cammed outwardly by the tapered surface forming the edge of the groove 92 as the male adapter part 50 is withdrawn.

Many modifications will be become readily apparent to those skilled in the art.

I claim:

1. A coupling comprising:
   a. a male member having
      i. a body extending along an axis from first end to a female member connection end and having a passageway extending therethrough and an outwardly facing ball engagement abutment;
      ii. a poppet positioned in said passageway, said poppet having a seal and being axially movable in said passageway from a sealed position closing said passageway to an open position permitting the flow of fluid through said passageway;
      iii. means yieldingly urging said poppet to said sealed position; and
      iv. a ball urging mechanism axially movable from a ball retention position axially aligned with and radially spaced from said engagement abutment to a ball release position;
   b. a female member having
      i. a female body extending along an axis from a first end to a male member connection end, said female body having a passageway extending therethrough;
      ii. a poppet positioned in said passageway, said poppet having a seal and being axially movable in said passageway from a sealed position closing said passageway to an open position permitting the flow of fluid through said passageway;
      iii. means yieldingly urging said poppet to said sealed position;
      iv. a tubular member extending from said female body connection end, said tubular member having a plurality of apertures, the centers of said apertures defining a plane substantially perpendicular to said axis;
      v. a ball positioned in each of said apertures, said balls having a diameter greater than the thickness of said wall and movable radially from a position in which a portion thereof is inwardly of said wall to a position in which a portion thereof is outwardly of said wall;
      vi. a tapered surface on said female body extending from said connection end toward said axis in an axial direction toward said first end, said tapered surface at least partially overlying said apertures to limit the extent of outward movement of said balls;

relative movement of said male member toward said female member causing said male member to maintain said balls in a radially outward position permitting said male member to be moved axially to a position at which
   (1) said male member poppet and said female member poppet contact one another and each becomes urged to its open position;
   (2) said engagement abutment becomes axially positioned to receive said balls;
   (3) said balls are moved inwardly to engage said engagement abutment; and
   (4) said ball urging mechanism retains said balls in engagement with said engagement abutment.

2. The coupling according to claim 1 wherein said ball engagement abutment comprises a portion of an annular groove.

3. The coupling according to claim 1 wherein said female body member is further provided with an inwardly facing annular seal and said male body member has an outwardly facing cylindrical wall surface sized and positioned to sealingly engage said annular seal prior to the opening of both of said female member poppet and said male member poppet, said annular seal being retained in a space between said female body and said tubular member.

4. The coupling according to claim 3 wherein said male member body is provided with a camming surface spaced from and tapering outwardly and away from said female member connection end, said camming surface urging said balls outwardly upon insertion of said male member into said female member.

5. The coupling according to claim 1 wherein said male member ball urging mechanism includes a sleeve encircling said body and a spring yieldingly urging said sleeve toward said female member connection end, said sleeve having a ball engagement end and an internal diameter at said ball engagement end having a diameter smaller than the diameter of a circle defined by the outermost portion of the balls when in their outermost position.

6. The coupling according to claim 5 wherein said female member cylindrical wall is sized to be received in the space between said sleeve and said ball engagement abutment.

7. The coupling according to claim 6 wherein said male member body is provided with an outwardly facing camming surface adjacent said ball engagement abutment to urge said balls outwardly prior to said balls becoming axially aligned with and engaged to said ball engagement abutment, said outwardly cammed balls positioned to contact said sleeve to urge said sleeve away from said female member connection end upon movement of said male member into said female member.

8. The coupling according to claim 7 wherein said apertures at the outer surface of said cylindrical wall have a size larger than the diameter of said balls and at the inner surface of said cylindrical wall have a size preventing the passage of said balls therethrough.

9. A coupling comprising:
   a. a female member having (A) a wall with (i) an outer surface and (ii) an inner surface defining a passageway extending along an axis from a male member engagement end to a fluid flow system end and a plurality of apertures extending through said wall, said apertures spaced axially from said male member engagement end and (B) a plurality of balls, one positioned in each of said apertures, said balls having a diameter greater than the thickness of said wall in the area of said apertures and being movable radially from a position in which a portion thereof is outwardly of said outer surface to a position in which a portion thereof is inwardly of said inner surface; and
   b. a male member having a wall with (i) an exterior surface (ii) an interior surface defining a passageway extending along said axis from an insertion end to a fluid flow connector end, said exterior surface including an annular groove having an outwardly facing abutment surface sized to be received within said female member passageway and to be engaged by said balls when axially aligned therewith and said balls extend radially inwardly from said inner surface and (iii) an annular release sleeve encircling said exterior surface, said sleeve yieldingly movable from a forward position at least partially aligned axially with said annular groove to a rearward position spaced axially from said abutment surface a distance permitting said balls to move into said annular groove as said male member is inserted into said female member, said annular release sleeve, when at said forward position, retaining said balls in said annular groove, said annular release sleeve having an internal surface and a leading end facing toward said female member, said internal surface at said leading end having a size smaller than the diameter of a circle defined by the outermost portion of said balls when said balls are at their outermost position, said balls engaging said sleeve at the intersection of said leading end and said internal surface such that continued movement of said male member into said female member moves said sleeve to said rearward position.

10. A coupling according to claim 9 wherein said female member has an inwardly facing annular seal engaged to said male member exterior surface.

11. A coupling according to claim 9 wherein said abutment surface defines part of an annular groove in which said balls are received.

12. A coupling according to claim 9 wherein said female member has an inwardly facing annular seal spaced axially from said apertures, said annular seal having a size smaller than the size of a circle defined by the innermost portions of said balls when positioned at their maximum radial inward extent from said inner surface and said male member includes
   i. a first portion adjacent said insertion end, said exterior surface of said first portion sized to sealingly engage said annular seal,
   ii. a second portion spaced from said first portion and extending to said abutment surface, said exterior surface of said second portion having a size greater than the size of a circle defined by the innermost portions of said balls when positioned at their maximum radial inward extent from said inner surface, and,
   iii. a third portion between said first portion and said second portion, said exterior surface of said third portion tapering outwardly between said first portion and said second portion.

13. A coupling according to claim 10 wherein said female member includes a body portion and a tubular segment engaged thereto, said inwardly facing annular seal being held in position between said body portion and said tubular segment.

14. A coupling according to claim 10 wherein said apertures are positioned in said tubular segment and said body portion includes (i) an end face at least partially aligned with said apertures and (ii) a tapered surface angularly positioned to said axis to restrict outward movement of said balls.

15. A coupling comprising:
   a. a male member having
      i. a body extending along an axis from first end to a female member connection end and having a passageway extending therethrough and an outwardly facing annular groove, a first outwardly facing cylindrical wall portion adjacent said female member connection end, a second outwardly facing cylindrical wall portion between said annular groove and said first outwardly facing cylindrical wall portion and a camming surface positioned axially between said first and said second outwardly facing cylindrical wall portions and tapering away from said axis;
      ii. a poppet positioned in said passageway, said poppet having a seal and being axially movable in said passageway from a sealed position closing said passageway to an open position permitting the flow of fluid through said passageway;
      iii. means yieldingly urging said poppet to said sealed position;
      iv. a sleeve having a first end yieldingly movable from a forward position axially aligned with and radially spaced from said annular groove to a retracted position spaced further from said female member connection end, said sleeve having an internal surface adjacent said first end encircling said second outwardly facing cylindrical wall portion in spaced relation;
   b. a female member having
      i. a female body extending along an axis from a first end to a male member connection end, said female body having a passageway extending therethrough;

ii. a poppet positioned in said passageway, said poppet having a seal and being axially movable in said passageway from a sealed position closing said passageway to an open position permitting the flow of fluid through said passageway;

iii. means yieldingly urging said poppet to said sealed position;

iv. engagement means including a cylindrical wall having a plurality of apertures spaced from said male member connection end, the centers of said apertures defining a plane substantially perpendicular to said axis;

v. a ball positioned in each of said apertures, said balls having a diameter greater than the thickness of said wall and movable radially from a position in which a portion thereof is inwardly of said wall to a position in which a portion thereof is outwardly of said wall, said balls, when outwardly of said wall, positioned to engage said sleeve at the intersection of said first end and said internal surface;

relative movement of said male member toward said female member causing said male member camming surface and second outwardly facing cylindrical wall portion to maintain said balls in a radially outward position permitting said male member to be moved axially to a position at which (1) said male member poppet and said female member poppet contact one another and each becomes urged to its open position;

(2) said annular groove becomes axially positioned to receive said balls;

(3) said balls are moved inwardly to engage said groove; and (4) said sleeve retains said balls in engagement with said annular groove.

16. The coupling according to claim 15 wherein said female body member is further provided with an inwardly facing annular seal and said male body member first outwardly facing cylindrical wall surface sealingly engages said annular seal prior to the opening of both of said female member poppet and said male member poppet.

17. The coupling according to claim 16 wherein said female member cylindrical wall is sized to be received in the space between said sleeve and said annular groove.

18. The coupling according to claim 15 further including a ball retention surface on said female body, said ball retention surface being positioned outwardly from and axially aligned at least partially with said apertures to prevent said balls from being removed outwardly from said apertures.

19. The coupling according to claim 18 wherein said apertures at the outer surface of said cylindrical wall have a size larger than the diameter of said balls and at the inner surface of said cylindrical wall have a size preventing the passage of said balls therethrough.

20. The coupling according to claim 15 wherein said engagement means includes a tubular member attached to said female body and extending outwardly from said male member connection end, said male member connection end having a ball retention surface positioned outwardly from and axially aligned at least partially with said apertures to prevent said balls from being removed outwardly from said apertures.

21. The coupling according to claim 18 wherein said female member is further provided with an inwardly facing annular seal retained between said female body and said tubular member and said male body member first outwardly facing cylindrical wall surface sealingly engages said annular seal prior to the opening of both of said female member poppet and said male member poppet.

22. A coupling comprising:

a. a female member having (A) a wall with (i) an outer surface and (ii) an inner surface defining a passageway extending along an axis from a male member engagement end to a fluid flow system end and a plurality of apertures extending through said wall, said apertures spaced axially from said engagement end, (B) a plurality of balls, one positioned in each of said apertures, said balls having a diameter greater than the thickness of said wall in the area of said apertures and being movable radially from a position in which a portion thereof is outwardly of said outer surface to a position in which a portion thereof is inwardly of said inner surface, said apertures at said outer surface being larger than said diameter of said balls and at said inner surface being smaller than said diameter of said balls and (C) a retainer on said female member at least partially overlying said apertures to prevent said balls from falling outwardly out of said apertures;

b. a male member having a wall with (i) an exterior surface and (ii) an interior surface defining a passageway extending along said axis from an insertion end to a fluid flow connector end, said exterior surface including an outwardly facing annular groove, a first outwardly facing cylindrical wall portion adjacent said insertion end, a second outwardly facing cylindrical wall portion sized to be received within said female member passageway positioned between said annular groove and said first outwardly facing cylindrical wall portion, said annular groove receiving said balls when axially aligned therewith; and c. an annular sleeve encircling said male member, said sleeve yieldingly movable from a forward position at least partially aligned axially with said annular groove to a rearward position spaced axially from said groove a distance permitting said balls to move over said second outwardly facing cylindrical wall portion and into said annular groove as said male member is inserted into said female member, said annular sleeve, when at said forward position, retaining said balls in said annular groove.

23. A coupling according to claim 22 wherein said female member has an inwardly facing annular seal engaged to said male member first outwardly facing cylindrical wall portion.

24. A coupling according to claim 22 wherein said female member has an inwardly facing annular seal spaced axially from said apertures, said annular seal being sealingly engaged to said first outwardly facing cylindrical wall portion and having a size smaller than the size of a circle defined by the innermost portions of said balls when said balls are positioned at their maximum radial inward extent from said inner surface.

25. A coupling according to claim 22 wherein said male member has a camming surface tapering outwardly between said first outwardly facing cylindrical wall portion and said second outwardly facing cylindrical wall portion.

26. A coupling according to claim 22 wherein said annular sleeve has a leading end facing toward said female member, said leading end sized to engage said balls as said balls move over said male member second outwardly facing cylindrical wall portion, continued movement of said male member into said female member while so engaged moving said sleeve to said rearward position.

* * * * *

UNITED STATES PATENT AND TRADEMARK OFFICE
CERTIFICATE OF CORRECTION

PATENT NO. : 5,893,391

DATED : April 13, 1999

INVENTOR(S) : Gary M. Jenski, Jr.

It is certified that error appears in the above-identified patent and that said Letters Patent is hereby corrected as shown below:

In column 7, line 21, delete "7" and insert --1--.
In column 8, line 31, delete "10" and insert --13--.
In column 9, line 42, delete "16" and insert --15--.
In column 9, line 64, delete "18" and insert --20--.

Signed and Sealed this

Third Day of August, 1999

Q. TODD DICKINSON

Attest:

Attesting Officer

Acting Commissioner of Patents and Trademarks